(12) United States Patent
Park et al.

(10) Patent No.: US 9,178,252 B2
(45) Date of Patent: Nov. 3, 2015

(54) STRUCTURE FOR ELECTROCHEMICAL DEVICE TO IMPROVE SAFETY AND ELECTROCHEMICAL DEVICE COMPRISING THE SAME

(71) Applicant: LG Chem, Ltd., Seoul (KR)

(72) Inventors: Young-Sun Park, Daejeon (KR); Myoung-Hun Lee, Seoul (KR); Pil-Kyu Park, Daejeon (KR); Eun-Ju Kang, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/712,445

(22) Filed: May 14, 2015

(65) Prior Publication Data

US 2015/0249276 A1 Sep. 3, 2015

Related U.S. Application Data

(62) Division of application No. 12/310,603, filed as application No. PCT/KR2007/004058 on Aug. 24, 2007, now Pat. No. 9,070,955.

(30) Foreign Application Priority Data

Aug. 25, 2006 (KR) .................. 10-2006-0081347

(51) Int. Cl.
*H01M 2/12* (2006.01)
*H01M 10/04* (2006.01)
*H01M 10/52* (2006.01)
*H01M 10/42* (2006.01)
*H01M 10/0587* (2010.01)
*H01M 10/0525* (2010.01)

(52) U.S. Cl.
CPC ........ *H01M 10/4235* (2013.01); *H01M 2/1241* (2013.01); *H01M 2/1247* (2013.01); *H01M 2/1282* (2013.01); *H01M 10/0525* (2013.01); *H01M 2200/10* (2013.01); *H01M 2200/20* (2013.01); *H01M 2200/30* (2013.01)

(58) Field of Classification Search
CPC ................ H01M 10/4235; H01M 10/0525; H01M 2/1241; H01M 2/1232; H01M 2/1247
USPC ........................ 429/53, 57, 58, 122
See application file for complete search history.

(56) References Cited

U.S. PATENT DOCUMENTS

2005/0008930 A1 1/2005 Johnson et al.
2006/0263676 A1 11/2006 Chang et al.

FOREIGN PATENT DOCUMENTS

JP 58154176 9/1983
(Continued)

OTHER PUBLICATIONS

International Search Report pertaining to PCT/KR2007/004058, dated Nov. 29, 2007, 2 pgs.

*Primary Examiner* — Karie O'Neill Apicella
(74) *Attorney, Agent, or Firm* — Lerner, David, Littenberg, Krumholz & Mentlik, LLP

(57) ABSTRACT

Disclosed is a sealed structure for an electrochemical device having a hollow space therein, further comprising a material generating gases via thermal decomposition in the hollow space. Also, disclosed is an electrochemical device comprising a cathode, an anode, a separator, an electrolyte, a casing for the device, and the structure for the electrochemical device.

10 Claims, 4 Drawing Sheets

(56) References Cited

FOREIGN PATENT DOCUMENTS

| | | |
|---|---|---|
| JP | 08287920 | 11/1996 |
| JP | 10-241733 A | 9/1998 |
| JP | 11-102691 | 4/1999 |
| JP | 2000-067847 A | 3/2000 |
| JP | 2003-331874 | 11/2003 |
| JP | 2004-127804 | 4/2004 |
| KR | 2003-0075889 A | 9/2003 |

STRUCTURE FOR ELECTROCHEMICAL DEVICE TO IMPROVE SAFETY AND ELECTROCHEMICAL DEVICE COMPRISING THE SAME

CROSS REFERENCE TO RELATED APPLICATIONS

The present application is a divisional of U.S. patent application Ser. No. 12/310,603 filed Feb. 25, 2009, which is a national phase entry under 35 U.S.C. §371 of International Application No. PCT/KR2007/004058, filed Aug. 24, 2007, published in English, which claims the benefit of Korean Patent Application No. 10-2006-0081347, filed Aug. 25, 2006. The disclosures of said applications are incorporated by reference herein.

TECHNICAL FIELD

The present invention relates to a structure for an electrochemical device containing a material capable of imparting excellent safety to the device even when the internal pressure or voltage of the device abnormally increases, and an electrochemical device comprising the same.

BACKGROUND ART

Recently, as electronic appliances have been downsized and lightened, and the use of portable electronic appliances has been generalized, many active studies have been conducted to develop lithium secondary batteries having high energy density.

A lithium secondary battery comprises a cathode and an anode, each formed of a material capable of lithium ion intercalation/deintercalation. An organic electrolyte or polymer electrolyte is injected between the cathode and the anode. Such lithium secondary batteries generate electric energy via redox reactions occurring upon lithium ion intercalation/deintercalation at the cathode and the anode.

However, such lithium secondary batteries have problems related with their safety, such as ignition and explosion, caused by the use of a non-aqueous electrolyte. The above problems become more serious as the capacity density of a battery increases. Particularly, when a battery is overcharged to a voltage higher than the normal drive voltage, an excessive amount of lithium is deintercalated from the cathode and the lithium produces dendrite at the anode so that both the cathode and the anode become thermally unstable, resulting in a rapid exothermic reaction including decomposition of the electrolyte. Due to the exothermic reaction, the battery causes a thermal runaway phenomenon followed by ignition and explosion, and shows a serious problem related with its safety.

Many attempts have been made to inhibit such ignition or explosion of a battery caused by overcharge or an increase in the temperature inside the battery. For example, an additive for a non-aqueous electrolyte has been used. However, it is necessary to introduce a great amount of the additive in order to improve the safety of a battery by using the additive for a non-aqueous electrolyte. Such direct introduction of the additive may cause degradation of the quality of the battery.

Therefore, there is a need for developing a novel means to improve the safety of an electrochemical device including a battery.

DISCLOSURE OF THE INVENTION

Technical Problem

Therefore, the present invention has been made in view of the above-mentioned problems. It is an object of the present invention to provide a structure for an electrochemical device which has a hollow space therein, comprises a material capable of improving the safety of the device in the hollow space, and allows easy control of the amount of the material contained in the hollow space.

It is another object of the present invention to provide a structure for an electrochemical device which causes the material contained in the hollow space thereof, preferably a material generating gases via thermal decomposition, to be discharged to the exterior of the structure so that the material generates gases via thermal decomposition before or after it is discharged to the exterior of the structure, and thus can improve the safety of the device by the gases generated in the exterior of the structure or the gases discharged to the exterior of the structure.

It is still another object of the present invention to provide an electrochemical device comprising the structure for an electrochemical device.

Technical Solution

In order to achieve the above-mentioned object, the present invention provides a structure for an electrochemical device comprising: a hollow cylindrical tube; a first member formed of a polymer and sealing one end of the hollow cylindrical tube; and a second member formed of a polymer or a metal, and sealing the other end of the hollow cylindrical tube, the structure further comprising a material generating gases via thermal decomposition in a hollow space thereof.

Also, the present invention provides a structure for an electrochemical device comprising: a tube having two or more hollow cylindrical tubes connected to each other longitudinally by way of a polymer; a third member for sealing one end of the tube; and a fourth member for sealing the other end of the tube, the structure further comprising a material generating gases via thermal decomposition in a hollow space thereof.

Further, the present invention provides a structure for an electrochemical device comprising: a hollow cylindrical tube having at least one opening on a surface thereof and sealed at both ends thereof; and a polymer member for sealing the opening, the structure further comprising a material generating gases via thermal decomposition in a hollow space thereof.

Further, the present invention provides an electrochemical device comprising a cathode, an anode, a separator, an electrolyte, a casing, and any one structure selected from the above three types of structures.

The structure for an electrochemical device is a sealed structure having a hollow space therein, comprises a material generating gases via thermal decomposition to improve the safety of the electrochemical device using the same structure inside the hollow space, and allows easy control of the amount of the material contained in the hollow space.

Additionally, the structure according to the present invention does not affect an electrochemical device when the device is in a normal temperature/voltage condition. However, when the internal temperature of the device abnormally increases or the device is subjected to an over-voltage state due to overcharge, a predetermined portion of the structure, preferably a portion formed of a polymeric component may melt. Such melting of a portion of the structure causes the inner part of the structure to be exposed to the exterior. At this time, the material contained in the hollow space of the structure, i.e. the material capable of generating gases via thermal decomposition, may be discharged to the exterior of the structure before it is thermally decomposed to generate gases. Otherwise, the material may generate gases via thermal decomposition before it is discharged to the exterior of the structure. The gases (carbon dioxide and/or nitrogen) generated at the exterior of the structure or discharged to the exterior of the structure can contribute to improvement of the safety of the device. The gases generated via thermal decomposition include a great amount of inert gases, which can interrupt any materials capable of heat emission inside the device from being in contact with oxygen, and can improve the safety of the device.

Further, the electrochemical device comprising the structure according to the present invention may be provided with a pressure-sensitive device, such as a CID (current interruption device), which interrupts charging of the device or converts a charging condition into a discharging condition by detecting variations in pressure, or may be provided with a pressure regulating valve, such as a vent, which allows emission of heat or gases inside the device to the exterior by detecting variations in the pressure. In this case, the gases discharged to the exterior of the structure or generated via the thermal decomposition of the material discharged to the exterior of the structure allow the pressure-sensitive device or the pressure regulating valve to operate, thereby improving the safety of the device.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Figure 1:
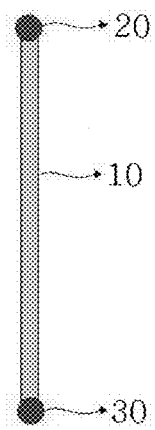
FIGS. 1 to 7 each are plan views illustrating preferred embodiments of the structure for an electrochemical device according to the present invention.

Hereinafter, the present invention will be explained in more detail.

The material contained in the hollow space of the structure according to the present invention includes a material generating gases via thermal decomposition, i.e. a material decomposed in itself by heat to generate gases, such as carbon dioxide or nitrogen. Non-limiting examples of the material include organic peroxides, carbonate compounds, azo compounds, hydrazide compounds, carbazide compounds, or the like. Such compounds may be used alone or in combination in the structure for an electrochemical device according to the present invention.

If the material generating gases via thermal decomposition is not incorporated into the structure according to the present invention, but is incorporated directly into an electrochemical device, it causes a reaction in voltage ranges of 0~3V and 3.5V~4.5V, resulting in degradation of the quality of the electrochemical device. Therefore, it is necessary to incorporate the gas-generating compound into the hollow space inside the structure for an electrochemical device so as to solve the above-mentioned problem.

Non-limiting examples of the organic peroxide include dibenzoyl peroxide, di-(2,4-dichlorobenzoyl peroxide), bis (3-methyl-3-methoxybutyl)peroxy dicarbonate), t-butyl peroxyneodecanoate, t-butyl peroxypivalate, dilauroyl peroxide, distearyl peroxide, t-butyl peroxy 2-ethylhexanoate, t-butyl peroxylaurate, t-butyl peroxy 2-ethylhexyl carbonate, t-butyl peroxybenzoate, t-hexyl peroxybenzoate, dicumyl peroxide, t-butyl cumyl peroxide, di-t-butyl peroxide, 2,5-dimethyl-2, 5-bis(t-butylperoxy)hexane, or the like. The above organic peroxides may be used alone or in combination.

Non-limiting examples of the carbonate compound include sodium bicarbonate ($NaHCO_3$).

Non-limiting examples of the azo compound include 2,2'-azobis(isobutyronitrile), 2,2'-azobis(2-methylbutyronitrile), 2,2'-azobis(2-methylvaleronitrile), 2,2'-azobis(2,3-dimethylbutyronitrile), 2,2'-azobis(2-methylcapronitrile), 2,2'-azobis (2,4-dimethylvaleronitrile), 1,1'-azobis(1-cyclohexylcyanide), 2,2'-dimethoxy-2,2'-azopropane, 2,2'-diethoxy-2,2'-azopropane, 2,2'-dipropoxy-2,2'-azopropane, 2,2'-diisopropoxy-2,2'-azopropane, 2,2'-dibutoxy-2,2'-azopropane, 2,2'-diisobutoxy-2,2'-azopropane, 2,2'-dineobutoxy-2,2'-azopropane, azodicarbonamide, or the like. Additionally, the above azo compounds may be used alone or in combination.

Non-limiting examples of the hydrazide compound include benzosulfonylhydrazide, 4,4'-oxybis(benzenesulfonylhydrazide), p-toluenesulfonylhydrazide, polybenzenesulfonylhydrazide, bis(hydrazosulfonyl)benzene, 4,4'-bis (hydrazosulfonyl)biphenyl, diphenyldisulfonylhydrazide, diphenylsulfone-3,3-disulfonylhydrazide, or the like. Additionally, the above hydrazide compounds may be used alone or in combination.

Further, non-limiting examples of the carbazide compound include terephthalzide, and other fatty acid azides and aromatic acid azides. The above carbazide compounds may be used alone or in combination.

The structure for an electrochemical device according to the present invention includes the following three preferred embodiments.

In the first embodiment, the structure for an electrochemical device comprises: a hollow cylindrical tube; a first member formed of a polymer and sealing one end of the hollow cylindrical tube; and a second member formed of a polymer or a metal and sealing the other end of the hollow cylindrical tube, the structure further comprising a material generating gases via thermal decomposition in a hollow space thereof.

The first embodiment of the structure for an electrochemical device is characterized in that either or both of the first member and the second member melt at a temperature higher than the normal drive temperature of the device or under a voltage higher than 4.3V. Herein, the temperature higher than the normal drive temperature preferably ranges from 70° C. to 200° C.

When either or both of the first member and the second member melt in the first embodiment of the structure for an electrochemical device, the inner part of the structure can be exposed to the exterior.

There is no particular limitation in the polymer forming the first member and the second member, as long as the polymer melts at a temperature higher than the normal drive temperature of the device or under a voltage higher than 4.3V. Non-limiting examples of such polymers include silicone resins, acrylic resins, urethane resins, epoxy resins, rubber, polyethylene, polypropylene, polybutene, polyacetaldehyde, polyformaldehyde, polypropylene oxide, polymethyl methacrylate, polyvinylidene chloride, polyvinyl fluoride, polyvinylidene fluoride, or the like. The above polymers may be used alone or in combination. The polymer forming the first member and the polymer forming the second member may be the same or different.

Additionally, the hollow cylindrical tube may be formed of a polymer or metal. Particularly, the hollow cylindrical tube forms the skeleton of the structure for an electrochemical device according to the present invention. The hollow cylindrical tube preferably has durability, electrochemical stability and thermal stability.

The polymer forming the hollow cylindrical tube may be the same as or different from the polymer forming the first member and the second member. Preferably, the polymer forming the hollow cylindrical tube has a higher melting point than the melting point of the polymer forming the first member and the second member. More preferably, the polymer forming the hollow cylindrical tube does not melt at a temperature higher than the normal drive temperature of the device or under a voltage higher than 4.3V but maintains its original shape. Non-limiting examples of such polymers include ethylene vinyl acetate (EVA), polystyrene, polyphenylene ether (PPE), polychlorotrifluoroethylene, polyvinyl chloride (PVC), polyethylene terephthalate (PET), polyamide, polycaprolactam, polycarbonate (PC), poly-(p-xylene), polyimide (PI), polyoxybenzoate (POB), polyetheretherketone (PEEK), polyphenylene sulfide (PPS), polyether sulfone (PES), polysulfone (PSU), silicone resins, acrylic resins, urethane resins, epoxy resins, rubber, polyethylene, polypropylene, polybutene, polyacetaldehyde, polyformaldehyde, polypropylene oxide, polymethyl methacrylate, polyvinylidene chloride, polyvinyl fluoride, polyvinylidene fluoride, or the like. The above polymers may be used alone or in combination.

Additionally, there is no particular limitation in the metal forming the hollow cylindrical tube and the second member, as long as the metal has a higher melting point than the melting point forming both the first member and the second member. Preferably, the metal does not melt at a temperature higher than the normal drive temperature of the device or under a voltage higher than 4.3V. Non-limiting examples of such metals include nickel, copper, aluminum, titanium, chrome, carbon, iron, cobalt, molybdenum, gold, silver, vanadium, SUS (stainless steel), alloys thereof, or the like. The above metals may be used alone or in combination.

FIG. 1 is a plan view showing a preferred embodiment of the structure for an electrochemical device according to the present invention. The structure is the first embodiment of the structure that comprises a hollow cylindrical tube 10 and a first member 20 and a second member 30 sealing both ends of the hollow cylindrical tube, and further comprises a material generating gases via thermal decomposition in the hollow space thereof. The polymer member and the end of the hollow cylindrical tube may be linked with each other, for example, by using a hot fusion process so that the end is sealed. Herein, the polymer member is introduced into the end of the hollow cylindrical tube after it is sealed. If the first member 20 and/or the second member 30 is formed of the same material as the hollow cylindrical tube 10, either end or both ends of the hollow cylindrical tube may be subjected to hot fusion to seal the structure without using a separate first member and/or second member.

Figure 2:
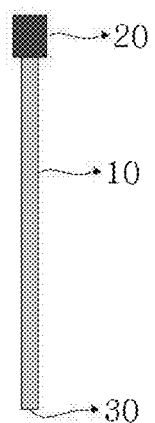
Figure 3:
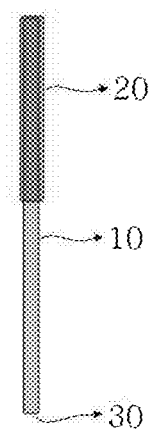

FIGS. 2 and 3 are plan views each showing another structure according to the first embodiment of the present invention, each structure comprising: a hollow cylindrical tube 10; a first member 20 formed of a polymer and sealing one end of the hollow cylindrical tube; and a second member 30 formed of a metal and sealing the other end of the hollow cylindrical tube, and further comprising a material generating gases via thermal decomposition inside the hollow space thereof. Herein, the first member formed of a polymer is introduced into one end of the hollow cylindrical tube in the form of a septum or capsule.

The second embodiment of the structure for an electrochemical device according to the present invention comprises: a tube having two or more hollow cylindrical tubes connected to each other longitudinally by way of a polymer; a third member for sealing one end of the tube; and a fourth member for sealing the other end of the tube, the structure further comprising a material generating gases via thermal decomposition in a hollow space thereof.

The second embodiment of the structure is characterized in that the polymer for connecting the two or more hollow cylindrical tubes melts at a temperature higher than the normal drive temperature of the device or under a voltage higher than 4.3V, so that the connected tubes are separated from each other and the inner part of the sealed structure is exposed to the exterior. Herein, the temperature higher than the normal drive temperature of the device preferably ranges from 70° C. to 200° C.

In the second embodiment of the structure, the polymer for connecting the two or more hollow cylindrical tubes may be present in the form of a tube or plate. However, there is no particular limitation in the shape and thickness of the polymer.

Additionally, there is no particular limitation in the polymer for connecting the two or more hollow cylindrical tubes, as long as the polymer melts at a temperature higher than the normal drive temperature of the device using the structure or under a voltage higher than 4.3V. Non-limiting examples of such polymers include silicone resins, acrylic resins, urethane resins, epoxy resins, rubber, polyethylene, polypropylene, polybutene, polyacetaldehyde, polyformaldehyde, polypropylene oxide, polymethyl methacrylate, polyvinylidene chloride, polyvinyl fluoride, polyvinylidene fluoride, or the like. The above polymers may be used alone or in combination.

In the second embodiment of the structure, the hollow cylindrical tube, the third member and the fourth member may be formed of a polymer or metal independently from each other.

There is no particular limitation in the polymers forming the hollow cylindrical tube, the third member and the fourth member. Therefore, each of the polymers forming the hollow cylindrical tube, the third member and the fourth member may be the same as or different from the polymer for connecting the two or more hollow cylindrical tubes. Preferably, each polymer has a higher melting point than the melting point of the polymer for connecting the two or more hollow cylindrical tubes. More preferably, each polymer does not melt at a temperature higher than the normal drive temperature of the device or under a voltage higher than 4.3V but maintains its original shape. Non-limiting examples of such polymers are the same as the polymer forming the hollow cylindrical tube in the first embodiment of the structure.

Additionally, there is no particular limitation in the metal forming the hollow cylindrical tube, the third member and the fourth member, as long as the metal has a higher melting point than the melting point of the polymer for connecting the two or more hollow cylindrical tubes. More preferably, the metal does not melt at a temperature higher than the normal drive temperature of the device or under a voltage higher than 4.3V. Non-limiting examples of such metals are the same as the metal forming the hollow cylindrical tube in the first embodiment of the structure.

Figure 4:
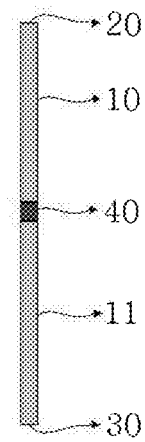

FIG. 4 is a plan view showing a preferred embodiment of the structure for an electrochemical device according to the present invention. The structure comprises a tube having two hollow cylindrical tubes 10, 11 connected longitudinally to each other by way of a polymer 40, and a third member 20 and a fourth member 30 formed of a polymer and sealing both ends of the hollow cylindrical tube, the structure further comprising a material generating gases via thermal decomposition in the hollow space thereof.

The third embodiment of the structure for an electrochemical device according to the present invention comprises: a hollow cylindrical tube having at least one opening on a surface thereof and sealed at both ends thereof; and a polymer member for sealing the opening, the structure further comprising a material generating gases via thermal decomposition in a hollow space thereof.

The third embodiment of the structure is characterized in that the polymer member for sealing the opening melts at a temperature higher than the normal drive temperature of the device or under a voltage higher than 4.3V, so that the inner part of the sealed structure is exposed to the exterior. Herein, the temperature higher than the normal drive temperature of the device preferably ranges from 70° C. to 200° C.

There is no particular limitation in the shape and size of the opening formed on the surface of the hollow cylindrical tube.

Figure 5:
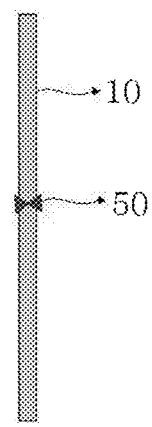
Figure 6:
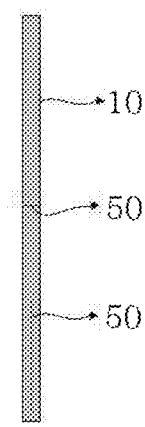
Figure 7:
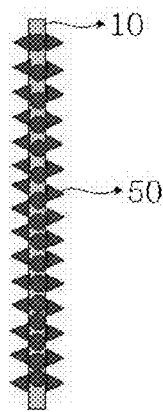

Also, there is no particular limitation in the shape and size of the polymer member for sealing the opening. For example, the polymer member 50 may have a notch-like shape indented into the hollow cylindrical tube 10 as shown in FIG. 5, a scratch-like shape formed on the hollow cylindrical tube 10 as a thin layer as shown in FIG. 6, an embossment-like structure protruding out from the hollow cylindrical tube 10 as shown in FIG. 7, or a combined shape thereof.

Additionally, there is no particular limitation in the polymer for the polymer member, as long as the polymer melts at a temperature higher than the normal drive temperature of the device using the structure or under a voltage higher than 4.3V. Non-limiting examples of such polymers include silicone resins, acrylic resins, urethane resins, epoxy resins, rubber, polyethylene, polypropylene, polybutene, polyacetaldehyde, polyformaldehyde, polypropylene oxide, polymethyl methacrylate, polyvinylidene chloride, polyvinyl fluoride, polyvinylidene fluoride, or the like. The above polymers may be used alone or in combination.

In the third embodiment of the structure, the hollow cylindrical tube may be formed of a polymer or metal.

There is no particular limitation in the polymer forming the hollow cylindrical tube. Therefore, the polymer forming the hollow cylindrical tube may be the same as or different from the polymer for the polymer member. Preferably, the polymer has a higher melting point than the melting point of the polymer member. More preferably, the polymer does not melt at a temperature higher than the normal drive temperature of the device or under a voltage higher than 4.3V but maintains its original shape. Non-limiting examples of such polymers are the same as the polymer forming the hollow cylindrical tube in the first embodiment of the structure.

Additionally, there is no particular limitation in the metal forming the hollow cylindrical tube, as long as the metal has a higher melting point than the melting point of the polymer for the polymer member. More preferably, the metal does not melt at a temperature higher than the normal drive temperature of the device or under a voltage higher than 4.3V. Non-limiting examples of such metals are the same as the metal forming the hollow cylindrical tube in the first embodiment of the structure.

Meanwhile, the structure for an electrochemical device according to the present invention is not limited to the above first through third embodiments of the structure. Any combination of the above embodiments is also included in the scope of the present invention.

Additionally, there is no particular limitation in the size of the structure for an electrochemical device according to the present invention.

The electrochemical device according to the present invention comprises a cathode, an anode, a separator, an electrolyte, a casing for the device and the structure for an electrochemical device according to the present invention.

The electrochemical device according to the present invention includes all types of devices in which electrochemical reactions are performed. Particular examples of the electrochemical device include all types of primary batteries, secondary batteries, fuel cells, solar cells, capacitors, or the like. Among the secondary batteries, lithium secondary batteries, including lithium metal secondary batteries, lithium ion secondary batteries, lithium polymer secondary batteries or lithium ion polymer secondary batteries, are preferred.

In the electrochemical device according to the present invention, the structure may be incorporated into hollow spaces in the device or the electrolyte, or as a center pin. The hollow spaces in the device may include a space between a jelly roll-like electrode assembly and the casing for the device, or a space between a jelly roll-like electrode assembly and a pouch, but is not limited thereto.

The material contained in the hollow space inside the structure for an electrochemical device may generate gases via thermal decomposition at a high temperature higher than the normal drive temperature of the device or a voltage higher than 4.3V, before or after the material is discharged to the exterior of the structure. The gases include a great amount of inert gases (carbon dioxide and/or nitrogen), which can interrupt any materials capable of heat emission inside the device from being in contact with oxygen and can improve the safety of the device.

Additionally, the electrochemical device comprising the structure according to the present invention may further comprise:

(a) a first safety device that detects variations in the pressure inside the electrochemical device to interrupt charging of the electrochemical device or to convert a charging condition into a discharging condition; (b) a second safety device that detects variations in the pressure inside the electrochemical device to emit the heat or gas present inside the electrochemical device; or (c) both the first safety device and the second safety device.

Non-limiting examples of the first safety device that may be used in the present invention include a pressure-sensitive device, such as a conventional CID known to those skilled in the art. The pressure-sensitive device may be a monolithic device, or may comprise: (i) a pressure-sensitive member; (ii) an electric wire for conducting current transferred from the pressure-sensitive member; and (iii) a member that responds to the current conducted from the electric wire to interrupt charging of the electrochemical device or to convert a charging condition into a discharging condition.

The pressure-sensitive device refers to a device that can detect a variation in the pressure inside the sealed electrochemical device, i.e. an increase in the pressure, and can interrupt current flow by itself; or can generate current toward the exterior or a control circuit to interrupt charging of the electrochemical device. Herein, the pressure-sensitive device may be a monolithic device serving not only as a safety device but also as a pressure-sensitive member. Otherwise, a separate pressure-sensitive device independent from the safety device may be used. However, there is no particular limitation in the type or mechanism of the pressure-sensitive device, as long as the device performs the above-mentioned function in a specific range of pressure.

Particular examples of the pressure-sensitive device include piezoelectric crystals generating electric current by detecting a variation in the pressure. Additionally, there is no particular limitation in the pressure range where the pressure-sensitive device operates, as long as the pressure range is out of the conventional internal pressure of the electrochemical device and does not allow explosion.

Additionally, there is no particular limitation in the second safety device, as long as the second safety device detects variations in the pressure inside the electrochemical device to emit the heat or gas (e.g. inflammable gas, etc.) present inside the electrochemical device to the exterior. Non-limiting examples of the second safety device include a pressure regulating valve, such as a vent.

When the electrochemical device according to the present invention further comprises the first safety device and/or the second safety device, the material contained in the hollow space inside the structure for an electrochemical device may generate gases via thermal decomposition at a high temperature higher than the normal drive temperature of the device or a voltage higher than 4.3V, before or after the material is discharged to the exterior of the structure.

Under these circumstances, either or both of the first safety device and the second safety device can operate by detecting a variation in the internal pressure of the device, including an increase in the pressure caused by the gases generated in the exterior of the structure or discharged to the exterior of the structure. Such serial mechanism can improve the safety of the electrochemical device.

The electrochemical device may be obtained by using a conventional method known to those skilled in the art. In a preferred embodiment of the method, the structure according to the present invention is used as a center pin, an electrode assembly is formed by winding a cathode, an anode and a separator interposed between both electrodes around the center pin in the form of a jelly roll to provide an electrode assembly, the electrode assembly is introduced in a casing, and then an electrolyte is injected thereto.

The electrode used in the electrochemical device according to the present invention may be manufactured by a conventional method known to one skilled in the art. For example, an electrode active material may be mixed with a solvent, and optionally with a binder, a conductive agent and a dispersant, and the mixture is agitated to provide slurry. Then, the slurry is applied onto a metal collector, and the collector coated with the slurry is compressed and dried to provide an electrode.

The electrode active material includes a cathode active material or an anode active material.

Cathode active materials that may be used in the present invention include: lithium transition metal composite oxides, such as $LiM_xO_y$ (M=Co, Ni, Mn, $Co_aNi_bMn_c$) (e.g. lithium manganese composite oxides such as $LiMn_2O_4$, lithium nickel oxides such as $LiNiO_2$, other oxides obtained by substituting manganese, nickel and cobalt in the above oxides partially with other transition metals, or lithium-containing vanadium oxide, etc.); or calcogenides, such as manganese dioxide, titanium disulfide, molybdenum disulfide, etc. However, the scope of the present invention is not limited thereto.

Anode active materials that may be used in the present invention include those currently used in anodes for electrochemical devices. Particular examples of the anode active materials include lithium metal, lithium alloys, carbon, petroleum coke, activated carbon, graphite or carbon fiber capable of lithium ion intercalation/deintercalation. Other metal oxides capable of lithium intercalation/deintercalation and having a potential vs. $Li^+/Li$ of less than 2V (for example, $TiO_2$ or $SnO_2$) may also be used. Particularly, carbonaceous materials, such as graphite, carbon fiber or activated carbon are preferred.

There is no particular limitation in the current collector, as long as the collector is formed of a highly conductive metal, allows easy attachment of slurry of an electrode active material thereto, and has no reactivity in the drive voltage range of the battery. Non-limiting examples of a cathode collector include foil formed of aluminum, nickel or a combination thereof. Non-limiting examples of an anode collector include foil formed of copper, gold, nickel, copper alloys or a combination thereof.

The electrolyte may comprise a non-aqueous solvent and an electrolyte salt, and may also include water.

There is no particular limitation in the non-aqueous solvent, as long as the solvent is one currently used for a non-aqueous electrolyte. Particular examples of the solvent include cyclic carbonates, linear carbonates, lactones, ethers, sulfoxides, acetonitriles, lactams and/or ketones.

Particular examples of the cyclic carbonates include ethylene carbonate (EC), propylene carbonate (PC), butylene carbonate (BC), fluoroethylene carbonate (FEC), or the like. Particular examples of the linear carbonates include diethyl carbonate (DEC), dimethyl carbonate (DMC), dipropyl carbonate (DPC), dibutyl carbonate, ethyl methyl carbonate (EMC), methyl propyl carbonate (MPC), or the like. Particular examples of the lactones include gamma-butyrolactone (GBL) and those of ethers include dibutyl ether, tetrahydrofuran, 2-methyltetrahydrofuran, 1,4-dioxane, 1,2-dimethoxyethane, 1,2-diethoxyethane, or the like. Particular examples of the esters include methyl formate, ethyl formate, propyl formate, methyl acetate, ethyl acetate, propyl acetate, methyl propionate, ethyl propionate, butyl propionate, methyl pivalate, or the like. Additionally, particular examples of the sulfoxides include dimethyl sulfoxide, or the like, and those of the lactams include N-methyl pyrrolidone (NMP), or the like. Further, particular examples of the ketones include polymethylvinyl ketone. Halogen derivatives of the above organic solvents may also be used. Such organic solvents may be used alone or in combination.

There is no particular limitation in the electrolyte salt, as long as the electrolyte salt is one currently used for a non-aqueous electrolyte. Non-limiting examples of the electrolyte salt include salts represented by the formula of $A^+B^-$, wherein $A^+$ includes a cation selected from the group consisting of $Li^+$, $Na^+$ and $K^+$, or a combination thereof, and $B^-$ includes an anion selected from the group consisting of $PF_6^-$, $BF_4^-$, $Cl^-$, $I^-$, $ClO_4^-$, $ASF_6^-$, $CH_3CO_2^-$, $CF_3SO_3^-$, $N(CF_3SO_2)_2^-$ and $C(CF_2SO_2)_3^-$, or a combination thereof. Particularly, a lithium salt is preferred. Such electrolyte salts may be used alone or in combination.

Although there is no particular limitation in the separator that may be used in the present invention, a porous separator is preferred, and particular examples thereof include polypropylene-based, polyethylene-based, and polyolefin-based porous separators.

Further, although there is no particular limitation in the outer shape of the electrochemical device according to the present invention, the electrochemical device may have a cylindrical shape using a can, a prismatic shape, a pouch-like shape or a coin-like shape.

Reference will now be made in detail to the preferred embodiments of the present invention. It is to be understood that the following examples are illustrative only and the present invention is not limited thereto.

Example 1

Manufacture of Structure for Electrochemical Device

First, 0.3 g of benzoyl peroxide was introduced into a hollow cylindrical tube having a diameter of 3 mm and a length of 57.5 mm and made of polypropylene. Then, both ends of the hollow cylindrical tube were sealed via hot fusion to provide a structure for an electrochemical device.

Example 2

Manufacture of Structure for Electrochemical Device

A structure for an electrochemical device was provided in the same manner as described in Example 1, except that di(2,4-dichlorobenzoyl) peroxide was used instead of benzoyl peroxide.

Example 3

Manufacture of Electrochemical Device

First, 94 wt % of $LiCoO_2$ as a cathode active material, 3 wt % of acetylene black as a conductive agent and 3 wt % of PVDF as a binder were mixed, and the resultant mixture was added to NMP (N-methyl-2-pyrrolidone) to form cathode slurry, which, in turn, was applied onto an aluminum (Al) collector, followed by drying, to provide a cathode.

Next, 95 wt % of artificial graphite as an anode active material and 5 wt % of PVDF as a binder were added to NMP to form anode slurry, which, in turn, was applied to a copper (Cu) collector, followed by drying, to provide an anode.

Then, 1M $LiPF_6$ was dissolved into a non-aqueous electrolyte containing ethylene carbonate (EC) and ethyl methyl carbonate (EMC) in a ratio of 1:2 (v:v, EC:EMC) to provide an electrolyte.

A porous polyethylene film was used as a separator, and the structure for an electrochemical device obtained according to Example 1 was used as a center pin.

The strip-like anode and the strip-like cathode were stacked on the separator, and wound around the center pin many times to provide a jelly roll-like structure. The jelly roll-like structure was received in a battery can having an outer diameter of 18 mm and a height of 65 mm, and insulation plates were disposed on the top and bottom surfaces of the electrodes. Additionally, an anode lead formed of nickel was drawn from the anode collector and welded to the battery can. A cathode lead formed of aluminum was drawn from the cathode collector and welded to an aluminum pressure regulating valve mounted on the battery cover. Finally, the electrolyte was injected thereto to provide a battery.

Example 4

Manufacture of Electrochemical Device

A battery was provided in the same manner as described in Example 3, except that the structure for an electrochemical device according to Example 2 was used instead of the structure for an electrochemical device according to Example 1.

Comparative Example 1

Manufacture of Electrochemical Device

A battery was provided in the same manner as described in Example 3, except that a conventional stainless hollow cylindrical tube (Dong Jin Industries, Co. 3Φ center pin made of iron) not sealed at both ends thereof was used instead of the structure for an electrochemical device according to Example 1.

Experimental Example 1

Evaluation of Overcharge Safety of Battery

The following experiment was performed by using the batteries according to Example 3 and Comparative Example 1 to evaluate the safety thereof. Each battery having a capacity of 2400 mAh was fully charged to 4.2V at 0.5C, and then the overcharge test was performed. The overcharge test was performed to 13.5V at 2C. During the test, the surface of each battery was insulated perfectly from heat to simulate a condition similar to the condition in a battery pack. Herein, the time required for the CID to cause a short, and the temperature and voltage of the battery were measured. The results are shown in FIGS. 8 and 9.

Figure 8:
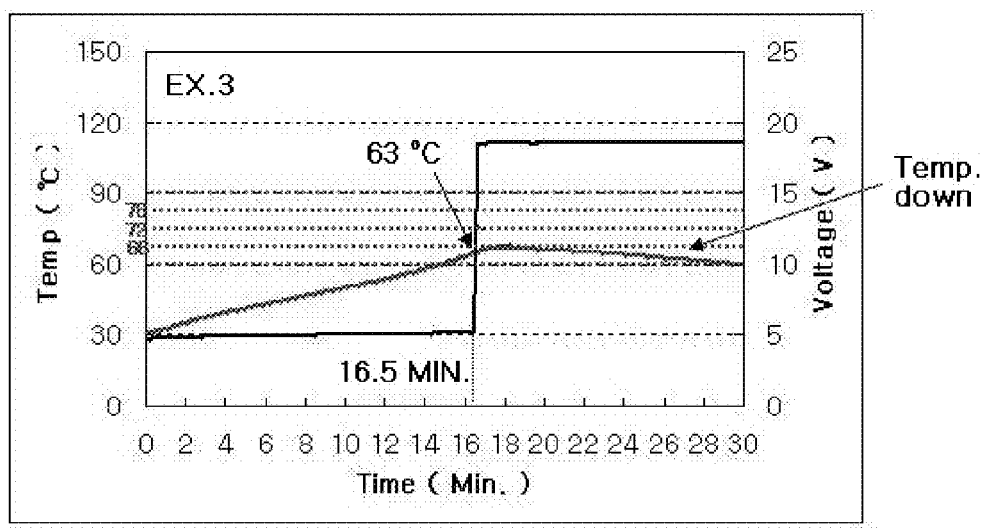
FIG. 8 is a graph showing the temperature and the voltage as a function of time, and the time required for a CID (current interruption device) to cause a short, in the battery according to Example 3.
Figure 9:
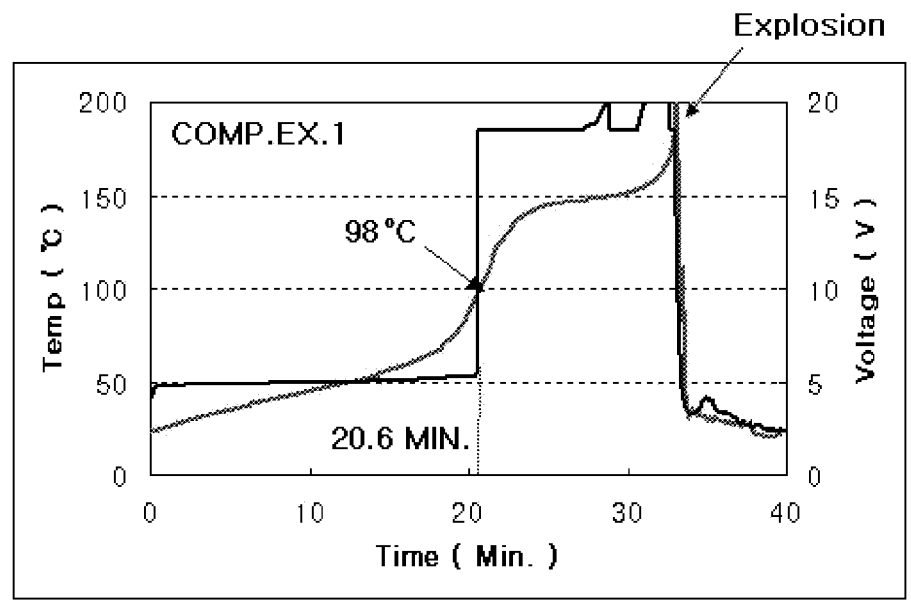
FIG. 9 is a graph showing the temperature and the voltage as a function of time, and the time required for a CID (current interruption device) to cause a short, in the battery according to Comparative Example 1.

As shown in FIGS. 8 and 9, the battery according to Example 3 shows a reduced time required for the CID to cause a short as compared to the battery according to Comparative Example 1 (20 minutes vs. 17 minutes), and a reduced peak temperature. This demonstrates that the electrochemical device (Example 3) using the structure according to the present invention has improved safety.

Experimental Example 2

High-Temperature Storage Test

The following thermal impact test was performed to evaluate the high-temperature safety of the batteries according to Example 3 and Comparative Example 1. Each battery was fully charged to 4.2V at 0.5C, heated to 75° C., maintained at the same temperature for 6 hours, cooled to −40° C., and maintained at the same temperature for 6 hours. The above cycle was repeated 12 times, and the drop in the voltage of each battery and the increment in the resistance of each battery were observed. The results are shown in the following Table 1.

TABLE 1

|  | Before storage | | After storage | |
| --- | --- | --- | --- | --- |
|  | Vol (V) | Imp (Ω) | Vol (V) | Imp (Ω) |
| Ex. 3 | 4.1763 | 54.45 | 4.1325 | 57.48 |
| Comp. Ex. 1 | 4.1758 | 55.61 | 4.1359 | 58.71 |

As shown in Table 1, the batteries according to Example 3 and Comparative Example 1 show similar results of drop in the voltage and the increment in the resistance after repeating the heating/cooling cycles. Therefore, it can be seen from the above results that the presence of the structure for an electrochemical device according to the present invention does not adversely affect the quality of the battery.

INDUSTRIAL APPLICABILITY

As can be seen from the foregoing, the structure for an electrochemical device according to the present invention is a sealed structure having a hollow space therein, comprises a material capable of improving the safety of the electrochemical device using the same by generating gases via thermal decomposition in the hollow space, and allows easy control of the amount of the material contained in the hollow space.

Additionally, the structure according to the present invention does not affect an electrochemical device when the device is in a normal temperature/voltage condition. However, when the internal temperature of the device abnormally increases or the device is subjected to an over-voltage state due to overcharge, a predetermined portion of the structure may melt. Such melting of a portion of the structure causes the inner part of the structure to be exposed to the exterior. At this time, the material contained in the hollow space of the structure, i.e. the material capable of generating gases via thermal decomposition is discharged to the exterior of the structure, before or after it is thermally decomposed to generate gases. The gases (carbon dioxide and/or nitrogen) generated at the exterior of the structure or discharged to the exterior of the structure can contribute to improvement of the safety of the device.

Further, the gases allow early operation of the safety device provided in the device, thereby improving the safety of the device.

Although several preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A structure suitable for use in an electrochemical device comprising:
   a tube having two or more hollow cylindrical tubes formed of a polymer or a metal connected to each other longitudinally by way of a polymer;
   a third member formed of a polymer or a metal for sealing one end of the tube; and
   a fourth member formed of a polymer or a metal for sealing the other end of the tube,
   the structure further comprising a material generating inert gases via thermal decomposition in a hollow space thereof,
   wherein the polymer or the metal of the two or more hollow cylindrical tubes has a higher melting point than the melting point of the polymer or the metal of the third member and the polymer or the metal of the fourth member.

2. The structure as claimed in claim 1, wherein the polymer connecting the two or more hollow cylindrical tubes melts at a temperature higher than a normal drive temperature of the device or at a voltage higher than 4.3V.

3. The structure as claimed in claim 1, wherein the material generating inert gases via thermal decomposition is at least one compound selected from the group consisting of organic peroxides, carbonate compounds, azo compounds, hydrazide compounds and carbazide compounds.

4. The structure as claimed in claim 1, wherein the polymer connecting the two or more hollow cylindrical tubes is at least one polymer selected from the group consisting of silicone resins, acrylic resins, urethane resins, epoxy resins, rubber, polyethylene, polypropylene, polybutene, polyacetaldehyde, polyformaldehyde, polypropylene oxide, polymethyl methacrylate, polyvinylidene chloride, polyvinyl fluoride and polyvinylidene fluoride.

5. The structure as claimed in claim 1, wherein each of the hollow cylindrical tube, the third member and the fourth member is independently formed of a polymer or a metal.

6. An electrochemical device comprising a cathode, an anode, a separator, an electrolyte, a casing for the device, and
   a structure for an electrochemical device comprising a tube having two or more hollow cylindrical tubes formed of a polymer or a metal connected to each other longitudinally by way of a polymer; a third member formed of a polymer or a metal for sealing one end of the tube; and a fourth member formed of a polymer or a metal for sealing the other end of the tube, the structure further comprising a material generating inert gases via thermal decomposition in a hollow space thereof, wherein the polymer or the metal of the two or more hollow cylindrical tubes has a higher melting point than the melting point of the polymer or the metal of the third member and the polymer or the metal of the fourth member.

7. The electrochemical device as claimed in claim 6, which is a secondary battery.

8. The electrochemical device as claimed in claim 6, wherein the structure is received in a hollow space in the device, contained in the electrolyte, or included as a center pin.

9. The electrochemical device as claimed in claim 6, wherein the material contained in the hollow space in the structure generates inert gases via thermal decomposition before or after it is discharged to the exterior of the structure, at a temperature higher than a normal drive temperature of the device or at a voltage higher than 4.3V.

10. The electrochemical device as claimed in claim 6, which further comprises:
   (a) a first safety device that detects variations in the pressure inside the electrochemical device to interrupt charging of the electrochemical device or to convert a charging condition into a discharging condition;
   (b) a second safety device that detects variations in the pressure inside the electrochemical device to emit the heat or gas present inside the electrochemical device; or
   (c) both the first safety device and the second safety device, wherein the material contained in the hollow space of the structure generates inert gases via thermal decomposition before or after it is discharged to the exterior of the structure, at a temperature higher than a normal drive temperature of the device or at a voltage higher than 4.3V, and
   either or both of the first safety device and the second safety device operate by detecting variations in the internal pressure of the device increased by the gases generated in the exterior of the structure or discharged to the exterior of the structure.

* * * * *